United States Patent
Yabe et al.

(10) Patent No.: US 9,162,845 B2
(45) Date of Patent: Oct. 20, 2015

(54) MEDIUM DELIVERY APPARATUS AND IMAGE FORMING APPARATUS

(71) Applicant: Oki Data Corporation, Tokyo (JP)

(72) Inventors: Kerama Yabe, Tokyo (JP); Yasunori Furusawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/465,109

(22) Filed: Aug. 21, 2014

(65) Prior Publication Data
US 2015/0054216 A1 Feb. 26, 2015

(30) Foreign Application Priority Data

Aug. 23, 2013 (JP) ................................. 2013-172930
May 29, 2014 (JP) ................................. 2014-111164

(51) Int. Cl.
*G11B 19/20* (2006.01)
*B65H 43/06* (2006.01)
*B65H 31/08* (2006.01)

(52) U.S. Cl.
CPC ............. *B65H 43/06* (2013.01); *B65H 31/08* (2013.01); *G11B 19/20* (2013.01)

(58) Field of Classification Search
CPC ............................... G11B 19/20; G11B 17/00
USPC ................... 360/99.08, 99.16, 99.12
See application file for complete search history.

(56) References Cited

U.S. PATENT DOCUMENTS

| | | | | |
|---|---|---|---|---|
| 6,005,831 A * | 12/1999 | Park | ............................. | 369/30.8 |
| 6,532,197 B1 * | 3/2003 | Cheung | ...................... | 369/30.32 |
| 6,657,429 B1 * | 12/2003 | Goldfine et al. | ............... | 324/232 |
| 7,751,155 B2 * | 7/2010 | Kimura et al. | ................ | 360/319 |
| 2004/0066188 A1 * | 4/2004 | Goldfine et al. | ............... | 324/228 |
| 2006/0232621 A1 * | 10/2006 | Hayamizu et al. | ............... | 347/19 |
| 2008/0310940 A1 * | 12/2008 | Yamada et al. | ........... | 414/222.04 |
| 2010/0125861 A1 * | 5/2010 | Inoue | ............................ | 720/601 |
| 2012/0320472 A1 * | 12/2012 | Thompson et al. | ........... | 360/132 |
| 2014/0198629 A1 * | 7/2014 | Takagi et al. | .................. | 369/100 |
| 2014/0238814 A1 * | 8/2014 | You | ............................... | 194/206 |

FOREIGN PATENT DOCUMENTS

| | | |
|---|---|---|
| JP | 2003-137479 A | 5/2003 |
| JP | 2006-213465 A | 8/2006 |
| JP | 2011-022179 A | 2/2011 |

* cited by examiner

*Primary Examiner* — Allen T Cao
(74) *Attorney, Agent, or Firm* — Panitch Schwarze Belisario & Nadel LLP

(57) ABSTRACT

An invented medium delivery apparatus includes a delivery unit, a medium stacking unit, a detection unit, and a sensor. The delivery unit delivers a conveyed medium. The medium stacking unit stacks the medium delivered from the delivery unit. The detection unit is disposed between the delivery unit and the medium stacking unit in a medium conveyance direction, and detects an amount of the medium delivered to the medium stacking unit. The sensor senses a motion of the detection unit. The detection unit has a detachable tip portion. The medium delivery apparatus is able to change the sheet number of media stacked on the medium stacking unit where the medium stacking unit is in a full status with the stacked media.

12 Claims, 16 Drawing Sheets

FIG.1

MEDIUM DELIVERY APPARATUS AND IMAGE FORMING APPARATUS

CROSS REFERENCE TO RELATED APPLICATIONS

This application claims priority benefits under 35 USC, section 119 on the basis of Japanese Patent Application No. 2013-172930 and Japanese Patent Application No. 2014-111164, the disclosure of which is incorporated herein by reference.

BACKGROUND OF THE INVENTION

1. Field of the Invention

This invention relates to a medium delivery apparatus and an image forming apparatus having a delivery stacker containing printer papers.

2. Description of Related Art

Conventional image forming apparatuses generally include a stacker full lever movable in a swinging manner in association with paper delivered to a delivery stacker, and a stacker full sensor detecting the swung stacker full lever. Such image forming apparatuses detect that the delivery stacker is in a full state with the papers stacked, as disclosed in, e.g., Japanese Patent Application Publication No. 2006-213,465.

Such a conventional image forming apparatus, however, may be required to adjust a sheet number of the papers stacked on the deliver stacker.

SUMMARY OF THE INVENTION

In accordance with an aspect of the invention, a medium delivery apparatus comprises: a delivery unit for delivering a conveyed medium; a medium stacking unit for stacking the medium delivered from the delivery unit; a detection unit disposed between the delivery unit and the medium stacking unit in a medium conveyance direction for detecting an amount of the medium delivered to the medium stacking unit; and a sensor for sensing a motion of the detection unit, wherein the detection unit has a detachable tip portion.

With the invented medium delivery apparatus, it is advantageous that the apparatus can change the sheet number of media stacked on the medium stacking unit where the medium stacking unit is in a full status with the stacked media.

BRIEF DESCRIPTION OF THE DRAWINGS

The above and other objects and features of the present invention will become apparent from the following detailed description and the appended claims with reference to the accompanying drawings.

FIG. 20A is a schematic plan view showing the lever where the film is attached according to the second embodiment of the invention, whereas

DETAILED DESCRIPTION OF EMBODIMENTS

Figure 1:
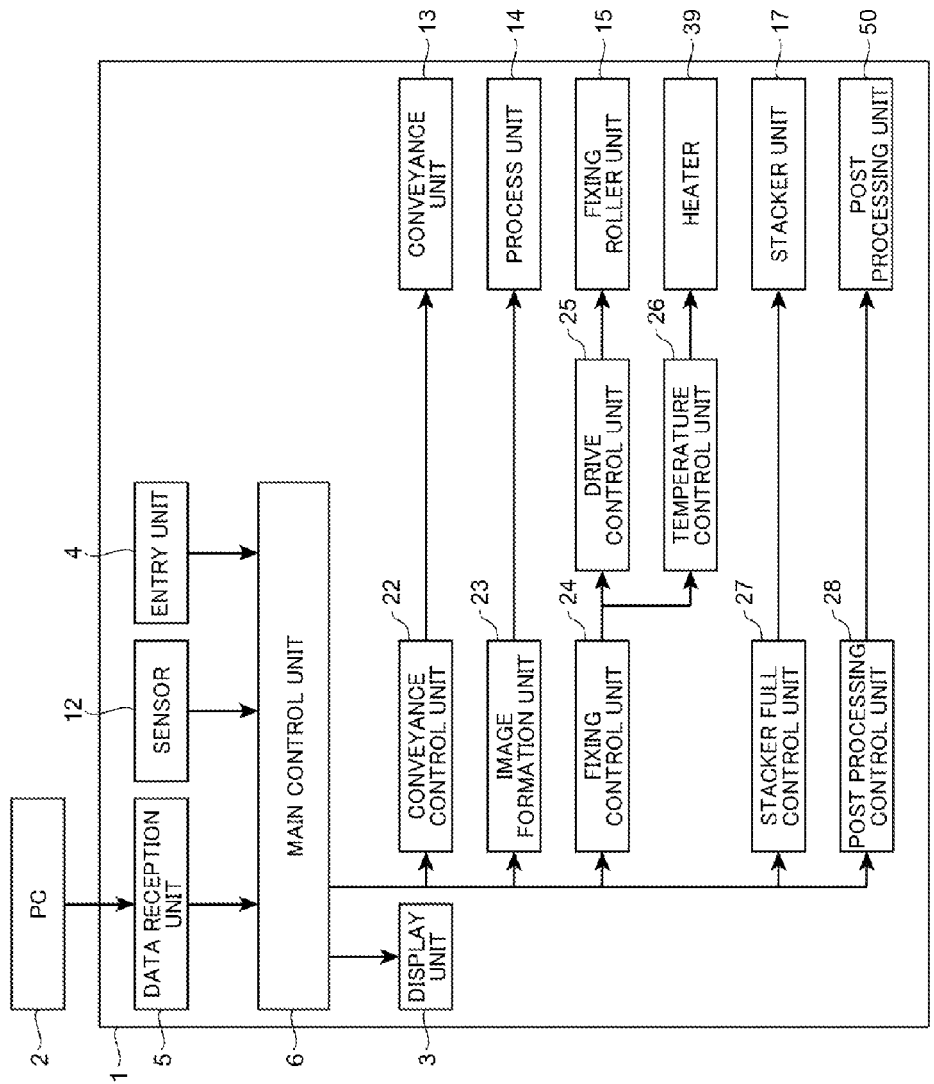
FIG. 1 is a block diagram showing a control structure of a printing apparatus according to a first embodiment of the invention.

Referring to the drawings, embodiments of a medium delivery apparatus and an image forming apparatus according to this invention are described.

First Embodiment

Figure 3:
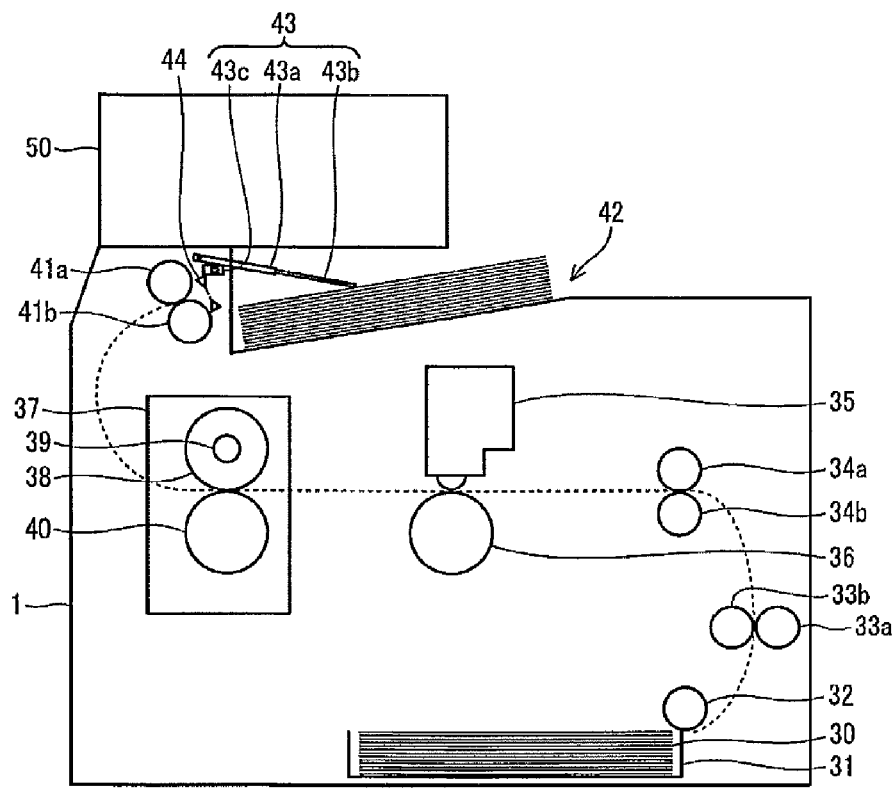
FIG. 3 is a schematic diagram illustrating a whole structure of the printing apparatus according to the first embodiment of the invention.

FIG. 3 is an illustration showing a structure of the printing apparatus according to the first embodiment of the invention.

In FIG. 3, a printing apparatus, serving as an image forming apparatus, includes a medium cassette 31, a feeding roller 32, a pair of register rollers 33a, 33b, a pair of conveyance rollers 34a, 34b, electrophotographic process units 35, a transfer roller 36, a fixing unit 37, a pair of delivery rollers 41a, 41b, a delivery stacker 42, a stacker-full sensor 53, a delivery sensor 44, and a post processing unit 50.

The medium cassette 31 contains recording media before printing. The feeding roller 32 feeds the recording medium 30 as a medium contained in the medium cassette 31 and sends the recording medium 30 to the pair of the register rollers 33a, 33b. It is to be noted that a sensor for detecting the recording medium 30 sent by the feeding roller 32 is arranged adjacently to the feeding roller 32, thereby measuring an interval between the recording media 30 thus fed, as an interval between papers. The pair of the register rollers 33a, 33b, the pair of the conveyance rollers 34a, 34b, and the pair of the delivery rollers 41a, 41b are disposed in the order from an upstream side in the conveyance direction of the recording medium 30, the pair of the register rollers 33a, 33b, the pair of the conveyance rollers 34a, 34b, and the pair of the delivery rollers 41a, 41b, and convey the recording medium 30 fed with the feeding roller 32.

The electrophotographic process units 35 are disposed on a downstream side, in the conveyance direction of the recording medium 30, of the pair of the register rollers 33a, 33b and the pair of the conveyance rollers 34a, 34b, for forming developer images on an image carrier. In a case of multicolor printing, the electrophotographic process units 35 are divided into each of process colors (cyan, yellow, magenta, black), and in a case of a monochrome printing, the electrophotographic process unit 35 is constituted only for black color. In this specification, electrophotographic process unit 35 is formed only for black color for the sake of brevity. The transfer roller 36 is disposed in facing the image carrier of the electrophotographic process unit 35, and transfers developer images formed on the image carrier to the recording medium 30 passing by the image carrier of the electrophotographic process unit 35.

The fixing unit 37 has a first fixing roller 38 formed with a fixing heater 39 inside, and a second fixing roller 40 disposed in facing the fixing roller 38. The fixing unit 37 fixes the developer images to the recording medium 30 passing between the first fixing roller 38 and the second fixing roller 40 in application of heat and pressure. The delivery stacker 42 serving as a delivery containing unit as well as a medium stacking unit, stacks and contains the recording medium 30 to which developer images are fixed and which is delivered out of the apparatus with the delivery rollers 41a, 41b serving as a delivery unit.

The stacker-full sensor 43 serving as the delivery detecting unit is disposed between the pair of the delivery rollers 41a, 41b and the delivery stacker 42. The stacker-full sensor 43 detects the containing amount of the recording medium 30 stacked on the delivery stacker 42. The stacker-full sensor 43 includes a lever 43a, serving as a pivotal member as well as one of components of the detection unit, which is pivotally movable around a rotation shaft in contact with the recording medium 30 contained in the delivery stacker 42. The stacker-full sensor 43 also includes a stacking amount restricting film (hereinafter, simply referred to as "film") 43b as an extension member detachably attached to a tip of the lever 43a on a side of the delivery stacker 42, and a sensor 43c for detecting the pivotally movable lever 43a. The full state of the delivery stacker 42 with the recording media 30 thereon is detected with the sensor 43c from detecting the position of the lever 43a.

The delivery sensor 44 is disposed on a downstream side of the delivery rollers 41a, 41b in the medium conveyance direction, between the stacker-full sensor 43 and the delivery rollers 41a, 41b, for detecting the recording medium 30 delivered from the delivery rollers 41a, 41b. A post processing unit 50 is an option unit arranged in a detachable manner on a top of the apparatus, above the delivery stacker 42, on the most downstream side in the medium conveyance direction of the recording medium 30. The post processing unit 50 can be, e.g., an image scanner for scanning the developer images, as images, printed on the recording medium 30 or a finisher for post processing such as stapling, punching, and sorting before the printed recording medium 30 is delivered to the delivery stacker 42.

Where the post processing unit 50 is mounted on the printing apparatus 1, an amount of the recording media that can be stacked on the delivery stacker 42 with no problem is reduced, because the post processing unit 50 occupies at least a part above the delivery stacker 42. Therefore, where the post processing unit 50 is mounted, the stacker-full sensor 43 is formed in detachably attaching the film 43b to the tip of the lever 43a so as to extend the length of the lever 43a as longer than in a situation that no post processing unit 50 is mounted, thereby reducing the full amount of the recording medium 30 on the delivery stacker 42 to be detected.

FIG. 1 is a block diagram showing a control structure of the printing apparatus according to the first embodiment. In FIG. 1, the printing apparatus 1 is formed of a display unit 3, an entry unit 4, a data reception unit 5, a main control unit 6, a sensor unit 12, a conveyance unit 13, a process unit 14, a fixing roller unit 15, the heater 39, a stacker unit 17, the post processing unit 50, a conveyance control unit 22, an image forming control unit 23, a fixing control unit 24, a drive control unit 25, a temperature control unit 26, a stacker-full control unit 27, and a post processing control unit 28. The printing apparatus 1 is connected with PC (personal computer) 2 or PCs as host apparatuses in a communicable manner via a communication line.

Hereinafter, referring to FIG. 3, the control structure of the printing apparatus 1 is described. The display unit 3 is, e.g., a display device, which is an output means displaying a variety of information such as, e.g., a status of the printing apparatus 1 and entry results at the entry unit 4. The entry unit 4 is formed of, e.g., a touch panel or control buttons. The entry unit 4 is an input means for receiving manipulations made by an operator or operators. The data reception unit 5 is a unit for receiving such as, e.g., printing data from the PC 2.

Figure 2:
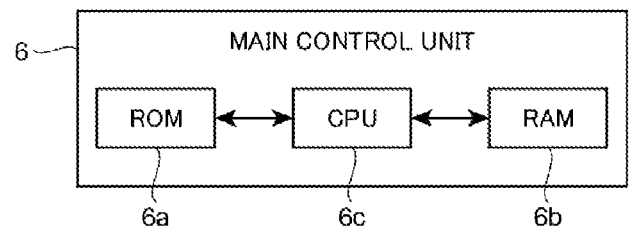
FIG. 2 is a block diagram showing a main control unit of the printing apparatus according to the first embodiment of the invention.

As shown in FIG. 2, the main control unit 6 is constituted of a ROM (read only memory) 6a and a RAM (random access memory) 6b serving as memory means, and of a CPU (central processing unit) 6c serving as a control means. The ROM 6a in advance memorizes data such as, e.g., control program for controlling the whole operation, stacker-full monitoring threshold value, paper interval constant, and printing sheet number threshold value, and the RAM 6b sequentially memorizes necessary information for operation such as, e.g., variants. The CPU 6c controls the whole operation of the printing apparatus 1 based on the control program stored in the ROM 6a to realize the control of the printing apparatus 1 done with the main control unit 6.

This main control unit 6 is connected with, e.g., the display unit 3, the entry unit 4, and the data reception unit 5, makes printing upon retrieving printing information from the data reception unit 5 and the entry unit 4, and controls displaying the status of the printing apparatus 1 and the entry results entered at the entry unit 4 at the display unit 3. The sensor unit 12 is a group of various sensors used for control of the respective control units including the stacker-full sensor 43 and the delivery sensor 44. The main control unit 6 controls the whole apparatus based on information entered from the sensor unit 12.

The conveyance unit 13, as a conveying unit, is formed of the feeding roller 32, the pair of the register rollers 33a, 33b, the pair of the conveyance rollers 34a, 34b, and the pair of the delivery rollers 41a, 41b. The conveyance control unit 22 is connected to the main control unit 6 for controlling the conveyance unit 13 to convey the medium and deliver the medium out of the apparatus. The process unit 14 is made of the electrophotographic process unit 35 and the transfer roller 36. In a case of a multicolor printer, the plural electrophotographic process units 35 are provided for respective colors. The image forming control unit 23 is connected to the main control unit 6 and controls the process unit 14.

The fixing roller unit 15 is formed of the first fixing roller 38 and the second fixing roller 40 in the fixing unit 37 and is controlled with the drive control unit 25. The heater 39 is controlled with the temperature control unit 26. The fixing control unit 24 is connected to the main control unit 6 and controls the fixing roller unit 15 and the heater 39 by controlling the drive control unit 25 and the temperature control unit 26. The stacker unit 17 is structured of the delivery stacker 42 and the stacker-full sensor 43. The stacker-full control unit 27 is connected to the main control unit 6 and controls the stacker unit 17 for controlling monitoring operation of the recording media stacked on the delivery stacker 42.

The post processing control unit 28 is connected to the main control unit 6 and monitors attachment or non-attachment of the post processing unit 50. If the post processing unit 50 is attached, the post processing control unit 28 controls operation of the post processing unit 50, and performs the post processing such as, e.g., image scanning and stapling. The main control unit 6 and the stacker-full control unit 27 of the printing apparatus 1 thus formed, detect the full state of the delivery stacker 42 with the recording media where the interval between the recording media conveyed with the conveyance unit 13 and where the stacker-full sensor 43 detects the recording medium in a state that the detected time exceeds the threshold time.

Figure 4:
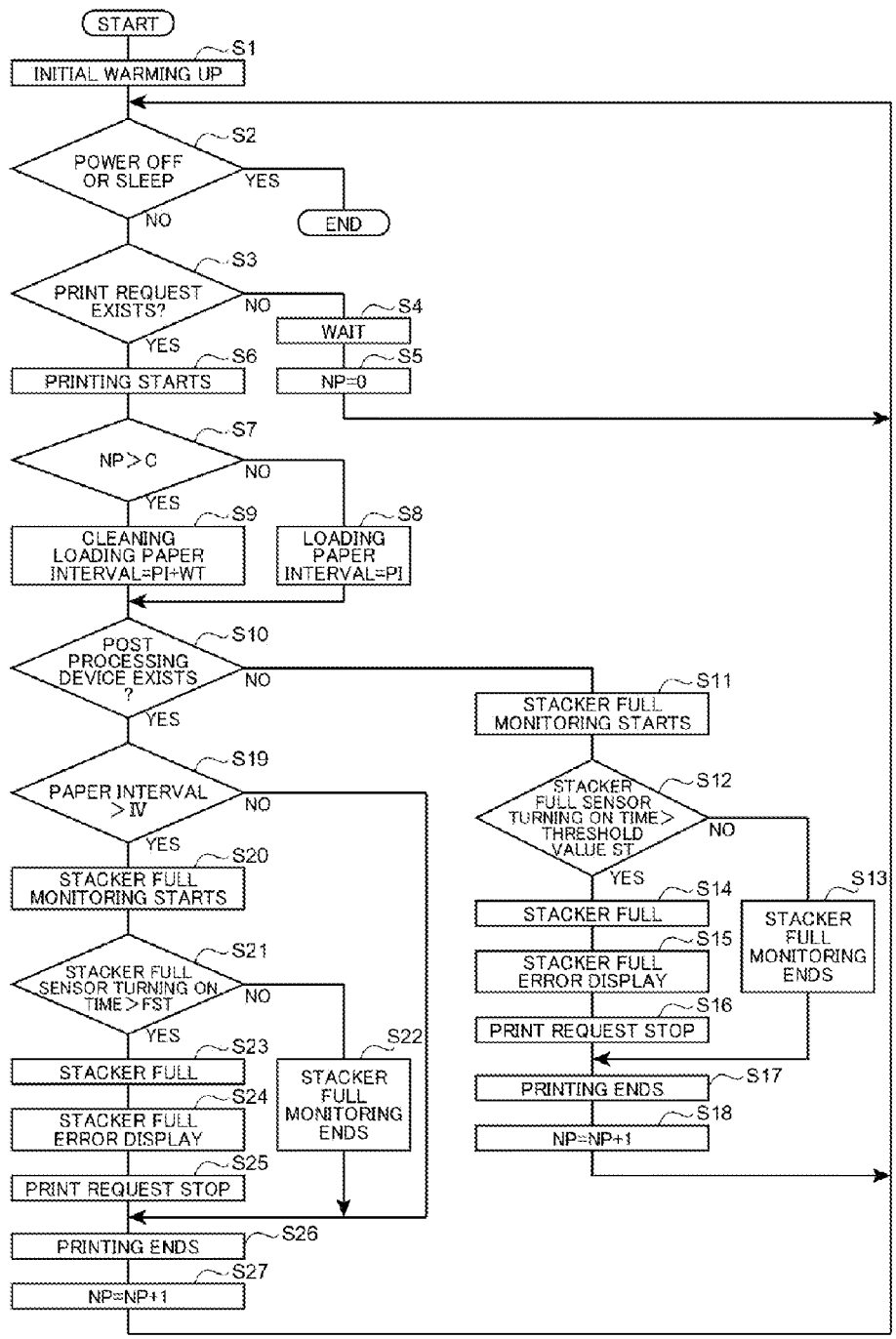
FIG. 4 is a flowchart showing steps of a stacker full control processing according to the first embodiment of the invention.

In operation of the structure thus formed, a stacker-full control processing done with the printing apparatus 1 shown in FIG. 3 is described in reference with FIGS. 1 to 3, along steps each having a letter S and a step number in a flowchart showing a flow of the stacker-full control processing in FIG. 4 according to the first embodiment.

First, the main control unit 6 detects power-on or return from a sleep mode as a power saving mode, and begins the stacker-full control processing.

The main control unit 6 at Step S1 initializes the respective control units including an exercise of an initial warming up processing done with such as the fixing control unit 24. The main control unit 6 at Step S2 judges as to whether detecting or not powering off or a transition request of the sleep mode. If it is judged as not detecting, the processing goes to Step S3, and if it is judged as detecting, this processing ends. At Step S3, the main control unit 6 judges as to whether either the data reception unit 5 or the entry unit 4 provides a printing request. If it is judged as there is the printing request, the processing proceeds to Step S6, and if it is judged as there is no printing request, the processing transits to Step S4.

Where the main control unit 6 judges that either the data reception unit 5 or the entry unit 4 provides no printing request, the printing apparatus 1 is controlled to be in a waiting state (Step S4). The main control unit 6 initializes a continuous printing sheet number variant NP stored in the RAM 6b to be zero at Step S5, and the processing proceeds to Step S2. On the other hand, where judging that either the data reception unit 5 or the entry unit 4 provides a printing request at step S3, the main control unit 6 retrieves printing information from either the data reception unit 5 or the entry unit 4, performs a warming up processing of the fixing control unit 24 at a printing target temperature and a printing conveyance speed, thereby starting printing by control of the conveyance control unit 22 and the image forming control unit 23.

The main control unit 6, starting printing, judges at Step S7 as to whether the continuous printing sheet number variant NP stored in the RAM 6b exceeds a printing sheet number threshold value C (during the cleaning execution) stored in advance in the ROM 6a. If it is judged that it does not exceed the value C, the processing goes to Step S8, and if it is judged that it exceeds the value C, the processing goes to Step S9. At Step S8, the main control unit 6, upon judging that the continuous printing sheet number variant NP does not exceed the printing sheet number threshold value C, controls a feeding paper interval as a paper interval fed with a paper interval constant PI (for example, a value indicating a distance between papers) respectively corresponding to the printing request stored the RPM 6a, and the processing goes to Step S10.

Where the main control unit 6 judges that the continuous printing sheet number variant NP exceeds the printing sheet number threshold value C at Step S9, the main control unit 6 requests cleaning to the image forming control unit 23, and the image forming control unit 23 controls to do cleaning operation removing a developer remaining on a photosensitive drum in the process unit 14. The recording medium 30 may not be fed during the cleaning operation. Upon this cleaning control, the feeding paper interval becomes "PI+WT" because a paper interval WT equivalent to a time for not feeding paper due to the cleaning control is added to the paper interval constant PI stored in the ROM 6a respectively corresponding to the printing request.

The main control unit 6 starting the printing operation, judges with the post processing control unit 28 as to whether the post processing unit 50 is attached at Step S10. If it is judged that the unit is not attached, the processing goes to Step S11 in order to perform a processing where no post processing unit 50 is attached to the printing apparatus 1 and where no film 43b is attached to the tip of the lever 43a of the stacker-full sensor 43. If it is judged that the unit is attached, the processing goes to Step S19 in order to perform a processing where the post processing unit 50 is attached to the printing apparatus 1 and where the film 43b is attached to the tip of the lever 43a of the stacker-full sensor 43 to extent the lever 43a. If the main control unit 6 judges that no post processing unit 50 is attached, the main control unit 6 at Step S11 starts the stacker-full monitoring control with the stacker-full control unit 27 where no post processing unit 50 is attached.

At Step 12, where the stacker-full control unit 27 renders the delivery sensor 44 detect the recording medium 30, the main control unit 6 detects the lever 43a moved pivotally by the recording medium 30 with the sensor 43c of the stacker-full sensor 43, as turning-on detection, and measures time up to that the lever 43a is not detected, as turning-off detection. The main control unit 6 judges as to whether the measured time exceeds the stacker-full judgment threshold value ST. If it is judged as not exceeding, the processing goes to Step S13, and if it is judged as exceeding, the processing goes to Step S14.

Where the main control unit 6 judges that the measured time exceeds the stacker-full judgment threshold value ST, it is judged that the delivery stacker 42 is in a full state at Step S14. At Step S15, the main control unit 6 displays that the delivery stacker 42 is full as an error indication at the display unit 3. At Step S16, the main control unit 6 stops printing request until cancellation of the full state of the delivery stacker 42. The main control unit 6 ends printing at Step S17.

The main control unit 6, finishing printing, adds one to the continuous printing sheet number variant NP stored in the RAM 6b at Step S18, and renders the processing go to Step S2. If the main control unit 6 judges that the delivery stacker 42 is in a full state, the main control unit 6 enters into a waiting state of the printing request at Steps S3, S4 to stop the printing request. The processing for cancelling the full state of the delivery stacker 42 is described below. At Steps S19, S10, the main control unit 6, upon judging that the prost processing unit 50 is attached, judges as to whether the paper interval during the printing operation exceeds the stacker-full monitoring start paper interval judgment threshold value IV before starting the stacker-full monitoring control. If it is judged as exceeding, the processing goes to Step S20 to start the stacker-full monitoring control, and if it is judged as not exceeding, the processing goes to Step S26 to end the printing operation without doing the stacker-full monitoring control.

As the paper interval during the printing operation, an interval between an rear end of the recording medium 30 thus fed and the front end of the subsequent recording medium 30 is measured by the sensor provided adjacent to the feeding roller 32. It is judged as that the paper interval during the printing operation exceeds the stacker-full monitoring start paper interval judgment threshold value IV in a case, e.g., when the cleaning operation is performed, when the recording medium 30 of the last page is printed, and when a retry of the feeding operation is done due to an occurrence of failure in paper feeding at the feeding roller 32. It is to be noted that, where no recording medium 30 subsequent to the fed recording medium 30 exists, it should be judged that the paper interval during the printing operation exceeds the stacker-full monitoring start paper interval judgment threshold value IV. The stacker-full monitoring start paper interval judgment threshold value IV is presumed as much smaller than the feeding paper interval (PI+WT) during the printing operation.

Where judging that the paper interval during the printing operation exceeds the stacker-full monitoring start paper interval judgment threshold value IV, the main control unit 6 at Step S20 starts the stacker-full monitoring control with the stacker-full control unit 27 in a case where the post processing unit 50 is attached. Where the stacker-full control unit 27 renders the delivery sensor 44 detect the recording medium 30, the main control unit 6 at Step S21 detects the lever 43a moved pivotally by the recording medium 30 with the sensor 43c of the stacker-full sensor 43, as turning-on detection, and measures time up to that the lever 43a is not detected, as turning-off detection. The main control unit 6 judges as to whether the measured time exceeds the stacker-full judgment threshold value for post processing apparatus FST. If it is judged as not exceeding, the processing goes to Step S22, and if it is judged as exceeding, the processing goes to Step S23. In this embodiment, the stacker-full judgment threshold for post processing apparatus FST is set as the same value as the stacker-full judgment threshold value ST. If it is judged that the measured time does not exceed the stacker-full judgment threshold for post processing apparatus FST, the main control unit 6 judges that the delivery stacker 42 is not in a full state, thereby ending monitoring of the stacker's state, and rendering the processing go to Step S26 to end the printing operation.

Where judging that the measured time does not exceed the stacker-full judgment threshold for post processing apparatus FST, the main control unit 6 at Step S22 judges that the delivery stacker 42 is not in the full state, thereby ending monitoring of the stacker's state, and rendering the processing go to Step S26 to end the printing operation. To the contrary, where judging that the measured time exceeds the stacker-full judgment threshold for post processing apparatus FST, the main control unit 6 at Step S23 judges that the delivery stacker 42 is in the full state. Then, the main control unit 6 at Step S24 displays that the delivery stacker 42 is full as an error indication at the display unit 3.

At Step S25, the main control unit 6 stops printing request until cancellation of the full state of the delivery stacker 42. The main control unit 6 ends printing at Step S26. The main control unit 6, finishing printing, adds one to the continuous printing sheet number variant NP stored in the RAM 6b at Step S27, and renders the processing go to Step S2. Where judging that the delivery stacker 42 is in the full state at Step S21, the main control unit 6 makes this apparatus enter into the waiting state for printing request at Steps S3, S4 in order to stop the printing request.

Figure 5:
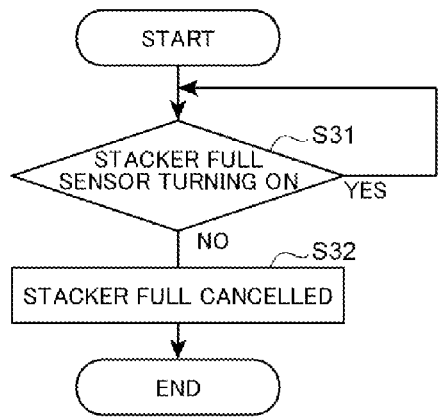
FIG. 5 is a flowchart showing steps of a stacker full cancellation processing according to the first embodiment of the invention.

Referring to FIGS. 1 to 3, a processing for cancelling the full state of the delivery stacker 42 done with the main control unit 6 is described along steps each having a letter S and a step number in a flowchart showing a flow of the stacker-full cancellation processing in FIG. 5 according to the first embodiment.

First, it is presumed that the main control unit 6 at Steps S14, S23 in FIG. 4 detects the delivery stacker 42 is in the full state. The main control unit 6 at Step 31 judges as to whether the sensor 43c of the stacker-full sensor 43 detects the lever 43a according to the stacker-full control unit 27, or namely, as to whether the stacker-full sensor is turned on. If it is judged that it is detected, the full state of the delivery stacker 42 is continued, and monitoring the stacker-full sensor 43 is continued. If it is judged that it is not detected, the processing goes to Step S32. Where the main control unit 6 judges that the sensor 43c of the stacker-full sensor 43 does not detect the lever 43a at Step S32, or namely, as to whether the stacker-full sensor is turned off, the main control unit 6 cancels the full state of the delivery stacker 42, thereby ending this processing. It is to be noted that the main control unit 6, upon cancelling the full state of the delivery stacker 42, cancels the stop of the printing request, and resumes the printing operation.

Figure 6:
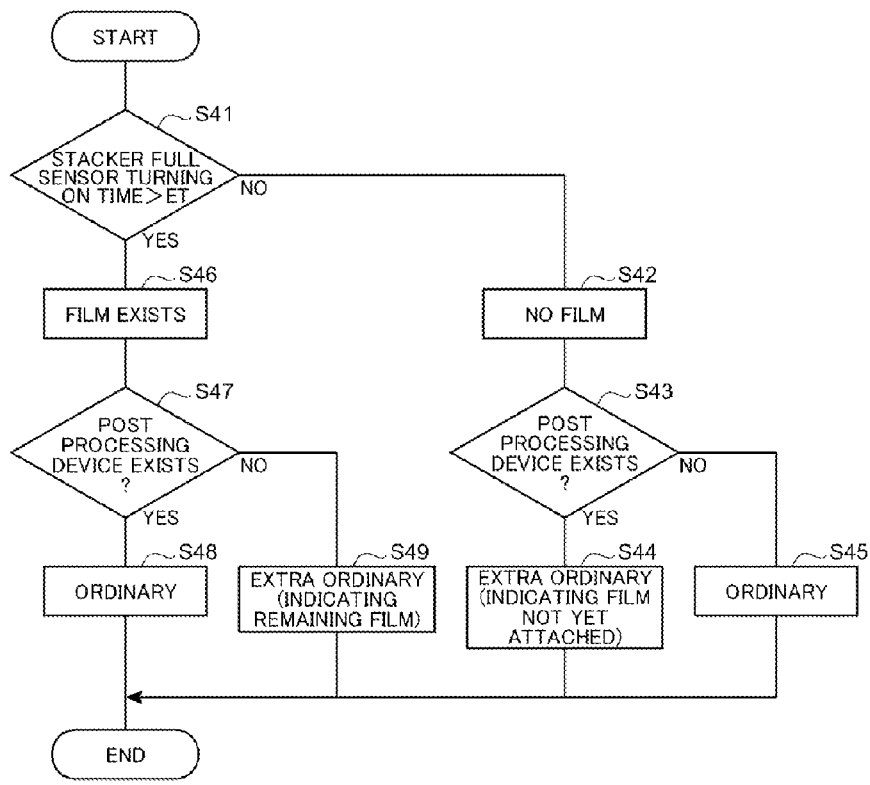
FIG. 6 is a flowchart showing steps of a film attachment judging processing according to the first embodiment of the invention.

Next, referring to FIGS. 1 to 3, a processing for monitoring the film 43b of the stacker-full sensor 43 done with the main control unit 6 is described along steps each having a letter S and a step number in a flowchart showing a flow of the film attachment judgment processing in FIG. 6 according to the first embodiment.

First, the main control unit 6 starts the stacker-full monitoring control at Steps S11, S20 in FIG. 4, and this processing is done when the stacker-full monitoring control starts. At Step S41, the main control unit 6 judges as to whether a time detecting the lever 43a with the sensor 43c of the stacker-full sensor 43 according to the stacker-full control unit 27, or namely a turning-on time, exceeds a threshold value for film attachment judgment ET. If it is judged that it does not exceed, the processing goes to Step S42, and if it is judged that it exceeds, the processing goes to Step S46.

Where judging that the time detecting the lever 43a with the sensor 43c of the stacker-full sensor 43, or namely a turning-on time, does not exceed a threshold value for film attachment judgment ET, the main control unit 6 judges at Step S42 that the film 43b is not attached to the lever 43a (or namely, no film state). At Step S43, the main control unit 6 judges, with the post processing control unit 28, as to whether the post processing unit 50 is attached. If it is judged as attaching, the processing goes Step S44, and if it is judged as not attaching, the processing goes to S45.

Where judging that the post processing unit 50 is attached, the main control unit 6 at Step S44 treats the status of the printing apparatus 1 as an extraordinary state, displays a warning that the film 43b is not attached to the lever 43a (forgetting attachment of the film) at the display unit 3, and ends this processing. At Step S45, the main control unit 6, upon judging that the post processing unit 50 is not attached, ends this processing because the printing apparatus 1 is in an ordinary state. To the contrary, where judging that the time detecting the lever 43a with the sensor 43c of the stacker-full sensor 43, or namely the turning-on time, exceeds the threshold value for film attachment judgment ET, the main control unit 6 judges that the film 43b is attached to the lever 43a, or namely that a film exists.

The main control unit 6 at Step S47 judges with the post processing unit 28 as to whether the post processing unit 28 is attached. If it is judged as attaching, the processing goes to Step S48, and if it is judged as not attaching, the processing goes to Step S49. At Step S48, the main control unit 6 judges that the post processing unit 50 is attached and ends this processing because the printing apparatus 1 is in the ordinary state. Where judging that the post processing unit 50 is not attached, the main control unit 6 at Step S49 assumes that the printing apparatus 1 is in an extraordinary state, displays a warning that the film 43b is attached to the lever 43a (forgetting removal of the film) at the display unit 3, and ends this processing.

The main control unit 6 thus detects a time detecting the lever 43a with the sensor 43c of the stacker-full sensor 43 and detects forgetting attachment or removal of the film 43b from information on the existence or non-existence of the post processing unit 50. It is to be noted that this film attachment judgment processing is performed while the delivery stacker 42 is not in the full state and is not performed while the delivery stacker 42 is in the full state.

Figure 7A:
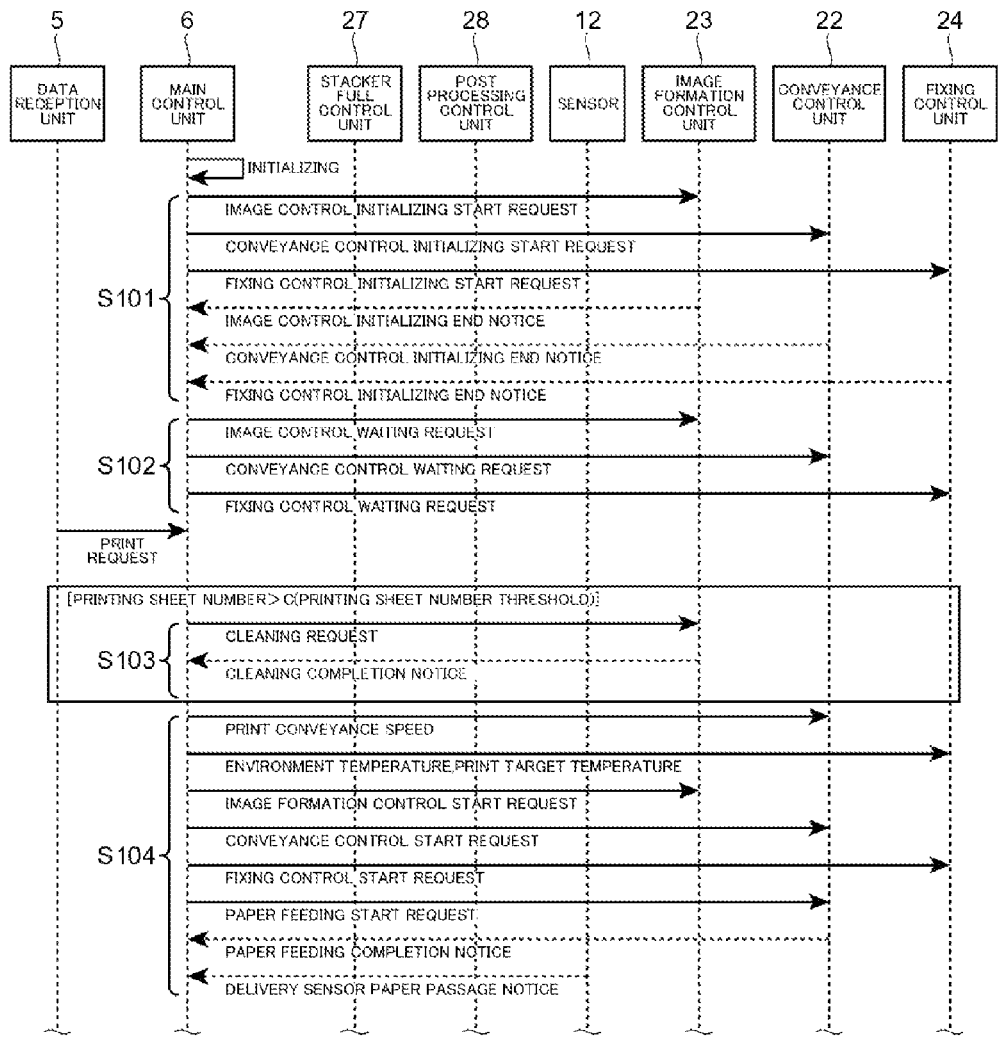
FIGS. 7A and 7B are sequential charts showing a flow of the stacker full control processing according to the first embodiment of the invention.
Figure 7B:
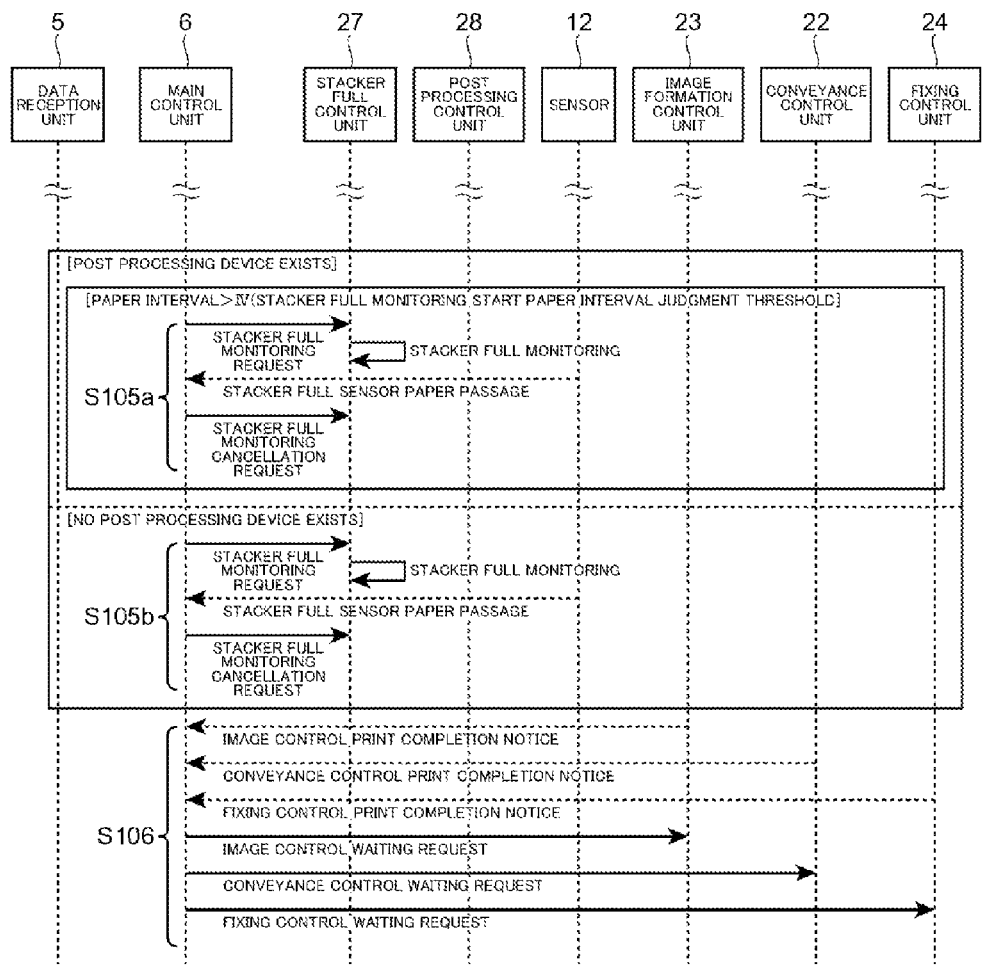

Next, referring to FIGS. 1 to 4, a stacker-full control processing in a case where the lever 43a is extended by attaching the film 43b to the tip of the lever 43a of the stacker-full sensor 43 shown in FIG. 3 is described along steps each having a letter S and a step number in a sequence chart showing a flow of the stacker-full control processing in FIG. 7 according to the first embodiment.

First, the main control unit 6 of the printing apparatus 1 detects power-on or return from a sleep mode as a power saving mode, and begins the stacker-full control processing.

At Step 101, the main control unit 6 starts initialization processing to provide an image control initializing start request to the image forming control unit 23, a conveyance control initializing start request to the conveyance control unit 22, and a fixing control initializing start request to the fixing control unit 24, respectively, thereby controlling the conveyance unit 13, the process unit 14, the fixing roller unit 15, and the heater 39 for initialization operation. The main control unit 6 at Step S102 receives an image control initializing end notice from the image forming control unit 23 completing the initialization operation, a conveyance control initializing end notice from the conveyance control unit 22, and a fixing control initializing end notice from the fixing control unit 24, and provides an image control waiting request to the image forming control unit 23, a conveyance control waiting request to the conveyance control unit 22, and a fixing control waiting request to the fixing control unit 24, respectively, thereby making the printing apparatus 1 in a waiting state (Step S4 in FIG. 4).

Where receiving a printing request from the data reception unit 5 while the printing apparatus 1 is in the waiting state, the main control unit 6 at Step S103 provides a cleaning request to the image forming control unit 23 in a case where it is judged that the printing sheet number, or namely the continuous printing sheet number variant NP stored in the RAM 6b, exceeds the printing sheet number threshold value C (during the cleaning operation) stored in advance in the ROM 6a. The main control unit 6 controls the process unit 14 to perform the cleaning operation, and receives the cleaning end notice from the image forming control unit 23. The main control unit 6 at Step S104 notifies the conveyance control unit 22 of the printing conveyance speed, the fixing control unit 24 of the environmental temperature and the printing target temperature, thereby executing the warming up processing.

Subsequently, the main control unit 6 notifies the image forming control unit 23 of an image forming start request to, the conveyance control unit 22 of a conveyance control start request, and the fixing control unit 24 of a fixing control start request, respectively, and starts printing operation upon controlling the conveyance unit 13, the process unit 14, the fixing roller unit 15, and the heater 39. The main control unit 6 thus starting the printing operation notifies the conveyance control unit 22 of a paper feeding start request to feed the paper or recording medium, receives a paper feeding completion notice from the conveyance control unit 22 and a delivery sensor paper passage notice indicating a passage of the recording medium at the deliver sensor 44 from the sensor 12.

Where judging, with the post processing control unit 28, as that the post processing unit 50 is attached, the main control unit 6 at Step S105a notifies the stacker-full control unit 27 of a stacker-full monitoring cancellation request, thereby monitoring the state of the stacker unit 17. The main control unit 6 notifies the stacker-full control unit 27 of the stacker-full monitoring cancellation request upon receiving the paper passage notice for stacker-full sensor from the sensor 12, thereby ending monitoring the stacker unit 17.

To the contrary, where judging, with the post processing control unit 28, as that the post processing unit 50 is not attached, the main control unit 6 at Step S105b judges as to whether the paper interval during the printing operation exceeds the stacker-full monitoring start paper interval judgment threshold value IV. If it is judged as exceeding, the main control unit 6 notifies the stacker-full control unit 27 of the stacker-full monitoring request, thereby monitoring the state of the stacker unit 17. If receiving the stacker-full paper passage notice from the sensor 12, the main control unit 6 notifies the stacker-full control unit 27 of the stacker-full monitoring cancellation request, thereby ending monitoring the stacker unit 17. The main control unit 6 at Step S106 receives an image control print completion notice from the image forming control unit 23, a conveyance control print completion notice from the conveyance control unit 22, and a fixing control print completion notice from the fixing control unit 24, and provides the image control waiting request to the image forming control unit 23, the conveyance control waiting request to the conveyance control unit 22, and the fixing control waiting request to the fixing control unit 24, respectively, thereby making the printing apparatus 1 in the waiting state.

Figure 8A:
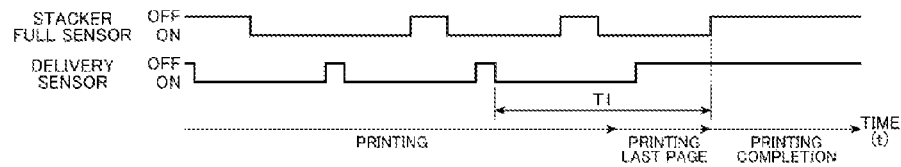
FIGS. 8A to 8E are timing charts of a stacker full sensor according to the first embodiment of the invention.
Figure 8B:
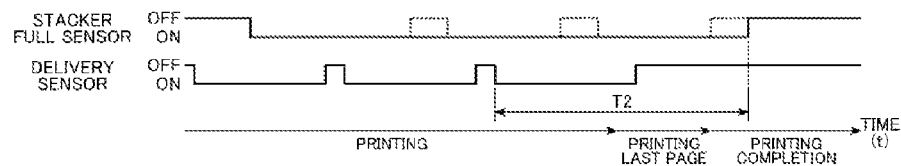
Figure 8C:
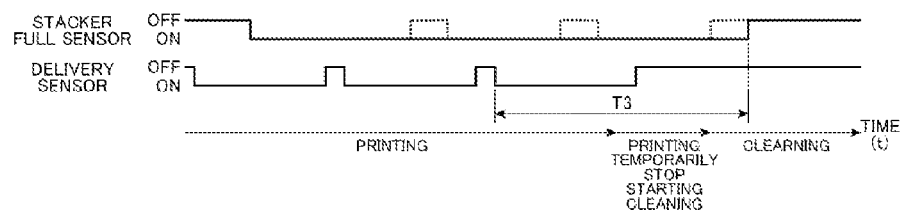
Figure 8D:
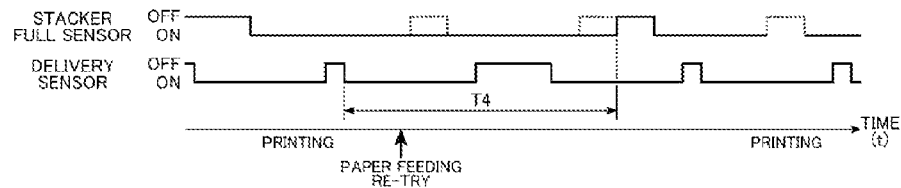

Referring to FIGS. 1 to 3, advantages of the stacker-full processing is described along a timing chart of the stacker-full sensor according to the first embodiment shown in FIGS. 8A to 8E. FIG. 8A is a timing chart of the stacker-full sensor where the lever 43a of the stacker-full sensor 43 is not extended, FIG. 8B to FIG. 8D are timing charts of the stacker-full sensor where the lever 43a of the stacker-full sensor 43 is extended as the film 43b is attached to the lever 43a. Abscissas shown in FIGS. 8A to 8E represent lapse of time.

Where the lever 43a of the stacker-full sensor 43 is not extended, and where three sheets of the printed recording media are delivered onto the delivery stacker 42, the signal level of the output signals of the delivery sensor and the sensor 43c of the stacker-full sensor 43 changes between ON (recording medium detected) and OFF (recording medium not detected) sequentially according to passages of the three sheets of the recording media, as shown in FIG. 8A. The reason of repeating ON (recording medium detected) and OFF (recording medium not detected) levels as the output signal of the sensor 43c of the stacker-full sensor 43 is that the sensor 43c detects the lever 43a moving pivotally from the recording medium's contacting to the tip of the lever 43a of the stacker-full sensor 43 while the recording media are stacked on the delivery stacker 42 upon passing by the delivery sensor.

In this situation, after the delivery sensor 44 detects the recording medium 30 with the stacker-full control unit 27, the main control unit 6 detects (detecting turning on) the lever 43a pivotally moved by the recording medium 30 with the sensor 43c of the stacker-full sensor 43. The main control unit 6 further measures time T1 up to when the lever 43a is not detected, and judges as to whether the measured time T1 exceeds the stacker-full judgment threshold value ST. If it is judged as exceeding, the delivery stacker 42 is judged as in the full state.

Where the lever 43a of the stacker-full sensor 43 is extended, and where three sheets of the printed recording media are delivered onto the delivery stacker 42, the signal level of the output signal of the delivery sensor changes between ON (recording medium detected) and OFF (recording medium not detected) sequentially according to passages of the three sheets of the recording media, as shown in FIG. 8B, but the signal level of the output signal of the sensor 43c of the stacker-full sensor 43 continuously keeps ON (recording medium detected) from a timing that the first sheet of the recording media is delivered to a timing that the third sheet of the terminal is stacked on the delivery stacker 42.

In this situation, where judging that the paper interval during the printing operation exceeds the stacker-full monitoring start paper interval judgment threshold value IV, the main control unit 6 measures time T2 up to when the lever 43a becomes not detected while detecting (detecting turning on) the lever 43a pivotally moved by the recording medium 30 of the last page with the sensor 43c of the stacker-full sensor 43, after the delivery sensor 44 detects the last page of the recording medium 30 with the stacker-full control unit 30. The main control unit 6 further judges as to whether the measured time T2 exceeds the stacker-full judgment threshold value for post processing apparatus FST. If it is judged as exceeding, it is judged that the delivery stacker 42 is in the full state.

Where the lever 43a of the stacker-full sensor 43 is extended, and where the recording medium printed immediately before a temporarily stop of the printing operation for starting the cleaning operation is delivered to the delivery stacker 42, the main control unit 6 as shown in FIG. 8C judges that the paper interval during the printing operation exceeds the stacker-full monitoring start paper interval judgment threshold value IV, and measures time T3 up to when the lever 43a becomes not detected (detecting turning off) while detecting (detecting turning on) the lever 43a pivotally moved by the recording medium 30 with the sensor 43c of the stacker-full sensor 43, after the delivery sensor 44 detects the recording medium 30 (recording medium 30 printed immediately before the temporary stop) with the stacker-full control unit 30. The main control unit 6 judges as to whether the measured time T3 exceeds the stacker-full judgment threshold value for post processing apparatus FST. If it is judged as exceeding, the main control unit 6 judges that the delivery stacker 42 is in the full state.

Where the lever 43a of the stacker-full sensor 43 is extended, and where the recording medium printed immediately before a retry of the paper feeding is delivered to the delivery stacker 42 due to an occurrence or occurrences of feeding failure at the feeding roller 32, the main control unit 6 as shown in FIG. 8D judges that the paper interval during the printing operation exceeds the stacker-full monitoring start paper interval judgment threshold value IV, and measures time T4 up to when the lever 43a becomes not detected (detecting turning off) while detecting (detecting turning on) the lever 43a pivotally moved by the recording medium 30 with the sensor 43c of the stacker-full sensor 43, after the delivery sensor 44 detects the recording medium 30 (recording medium 30 printed immediately before the retry of the paper feeding) with the stacker-full control unit 30. The main control unit 6 judges as to whether the measured time T4 exceeds the stacker-full judgment threshold value for post processing apparatus FST. If it is judged as exceeding, the main control unit 6 judges that the delivery stacker 42 is in the full state.

Figure 8E:
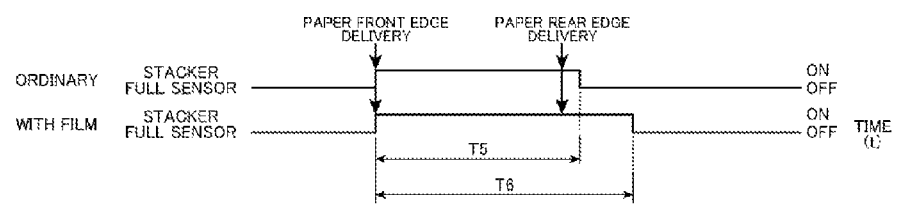

FIG. 8E is a timing chart of the output signal of the sensor 43c of the stacker-full sensor 43 when a single sheet of the recording medium is printed. As shown in FIG. 8E, in comparison between an ordinary state (upper stage) where the lever 43a of the stacker-full sensor 43 is not extended and a state (lower stage) where the lever 43a of the stacker-full sensor 43 is extended, time T6 original document a state where the lever 43a of the stacker-full sensor 43 is extended is longer than time T5 of the ordinary state where the lever 43a of the stacker-full sensor 43 is not extended, with respect to time that the output signal of the sensor 43c of the stacker-full sensor 43.

Because the main control unit 6 measures time that the output signal of the sensor 43c of the stacker-full sensor 43 shows the signal level of ON, and because the main control unit 6 judges as to whether the time exceeds the threshold value for film attachment judgment ET, the main control unit 6 can make a judgment as to whether the film 43b is attached to the lever 43a of the stacker-full sensor 43. The main control unit 6 thus can detect the state that the film 43b is not yet attached or is remaining as attached from the combination of the existence or non-existence of the film 43b of the lever 43 of the stacker-full sensor 43 and the existence or non-existence the post processing unit 50, or in other words, can judge that the film 43b is forgotten to be attached if the post processing unit 50 is provided whereas can judge that the film 43b is forgotten to be removed if the post processing unit 50 is not provided.

As described above, according to the first embodiment, detachably attaching the film 43b to the lever 43a brings an advantage that the sheet number of the paper to be stacked on the delivery stacker when the delivery stacker is detected as in the full state is changeable. Where the interval of the recording media becomes longer than the prescribed interval, the stacker-full sensor detects the full state of the deliver stacker, thereby advantageously preventing the delivery stacker from being detected erroneously in the full state. This apparatus advantageously can detect the state that the film is not yet attached or is remaining as attached from the confirmation of the combination of the existence or non-existence of the film of the lever of the stacker-full sensor and the existence or non-existence the post processing unit.

Second Embodiment

In the second embodiment, a delivery mechanism as a medium delivery apparatus constituted of the delivery rollers 41a, 41b, the delivery stacker 42, the stacker-full sensor 43, and the lever 43a is described. It is to be noted that the structure of the printing apparatus is substantially the same as that in the first embodiment, and a detailed description of the printing apparatus is omitted for the sake of brevity. The delivery mechanism according to the second embodiment is applicable to the first embodiment in any feasible form or combination.

Figure 9:
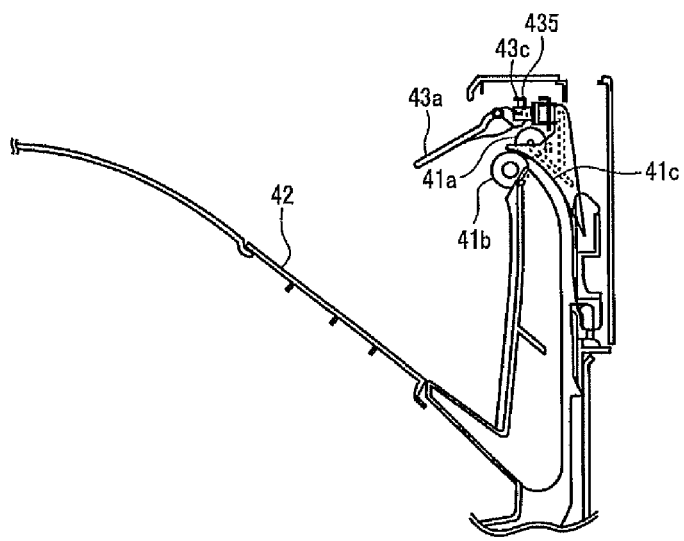
FIG. 9 is a schematic cross-sectional side view showing a delivery mechanism where no film is attached according to a second embodiment of the invention.
Figure 14:
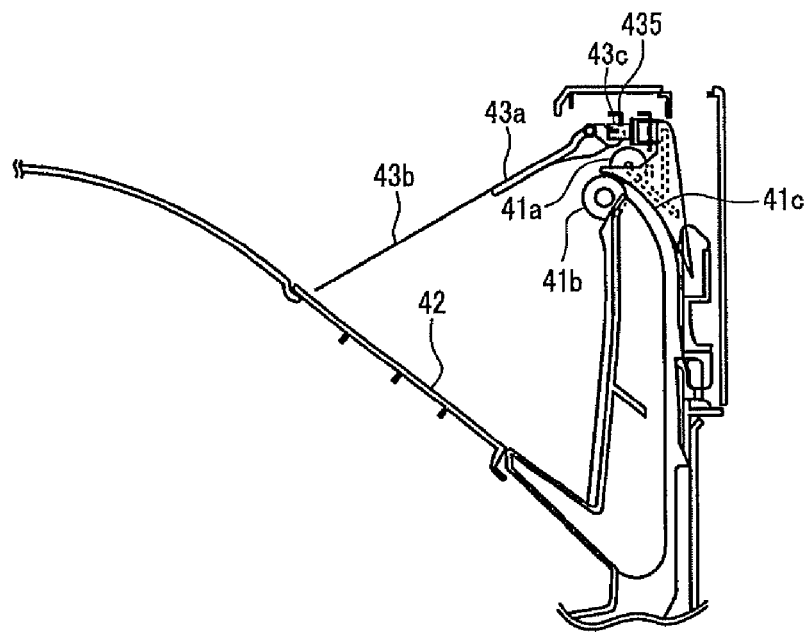
FIG. 14 is a schematic cross-sectional side view showing the delivery mechanism where a film is attached according to the second embodiment of the invention.

FIG. 9 is a schematic cross-sectional side view showing the delivery mechanism where no film is attached according to the second embodiment. FIG. 14 is a schematic cross-sectional side view showing the delivery mechanism where a film is attached according to the second embodiment. Parts or components in the second embodiment substantially the same as those in the first embodiment are given with the same reference numbers, respectively, and their descriptions are omitted for the sake of brevity. In FIGS. 9, 14, the delivery rollers 41a, 41b are arranged facing each other in sandwiching the conveyance route 41c of the recording medium. The delivery roller 41a disposed on an upper side of the conveyance route 41c is disposed on an upstream side in the horizontal conveyance direction of the recording medium with respect to the delivery roller 41b disposed on a lower side of the conveyance route 41c. The delivery unit for delivering the conveyed recording medium is formed with the delivery rollers 41a, 41b.

The delivery stacker 42 serving as a medium stacking unit for stacking the recording media delivered from the delivery unit is arranged on a lower side in the vertical direction and on a downstream side in the conveyance direction of the recording medium with respect to the delivery rollers 41a, 41b. The delivery stacker 42 is formed with a slope formed in obliquely rising on the downstream side in the delivery conveyance direction of the recording medium with respect to the horizontal direction. The stacker-full sensor 43 shown in FIG. 3 is disposed between the delivery rollers 41a, 41b and the delivery stacker 42 in the conveyance direction of the recording medium, thereby detecting a contained amount of the recording media 30 stacked on the delivery stacker 42.

The stacker-full sensor 43 is formed in disposing the lever 43a as a detection member pivotally movable around a rotation center in contacting the recording medium 30 contained at the deliver stacker 42, the sensor 43c detecting the movement of the pivotally movable lever 43a such as, e.g., a photo sensor, and a plate inner 435 supporting the lever 43a and the sensor 43c. The stacker-full sensor 43 detects the delivery stacker 42 in the full state with recording media 30 contained therein by finding out the position of the lever 43a with the sensor 43c.

As shown in FIG. 14, the film 43b as a tip member, or namely a stacking amount changeable member, is detachably attached to the lever 43a on a side of the delivery stacker 42. The film 43b can change a detection amount of the recording media 30 contained on the delivery stacker 42. That is, the film 43b changes the relationship between the amount of the media delivered on the delivery stacker 42 and the movement of the lever 43 a detected by the sensor 43c.

Figure 16:
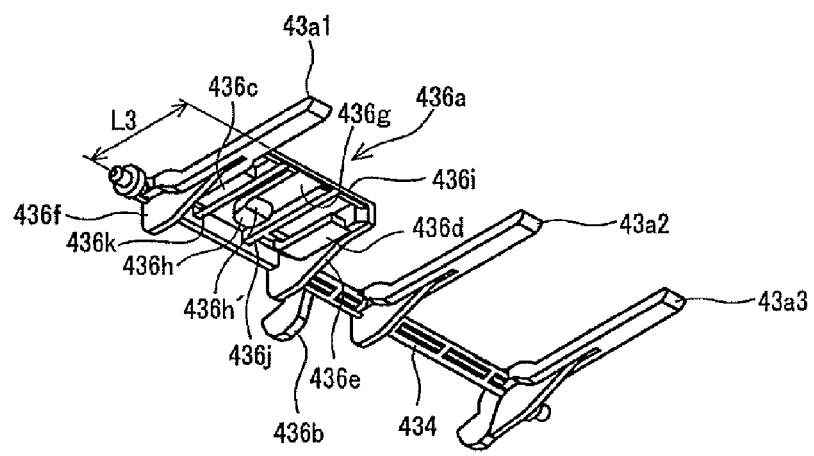
FIG. 16 is a schematic perspective view showing a lever where no film is attached according to the second embodiment of the invention.
Figure 17:
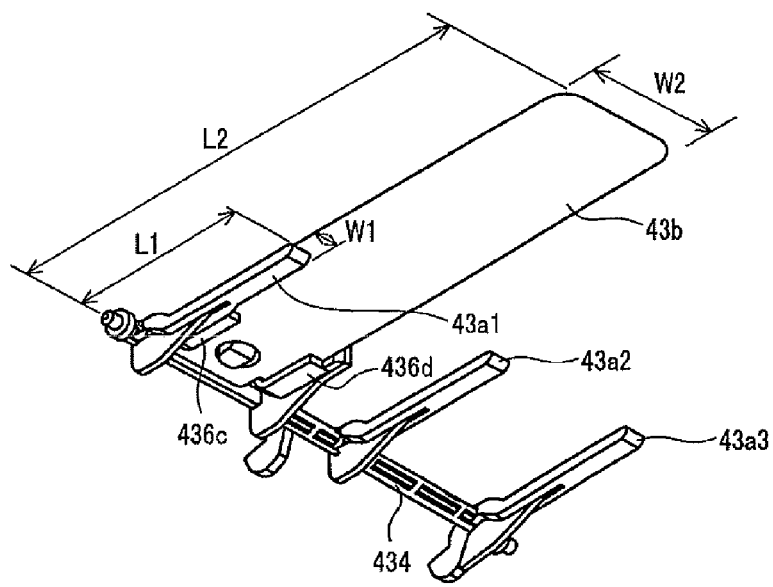
FIG. 17 is a schematic perspective view showing the lever where the film is attached according to the second embodiment of the invention.
Figure 19:
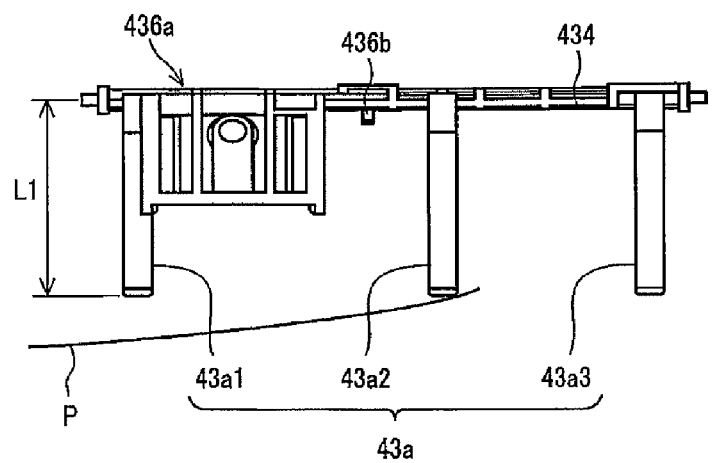
FIG. 19 is a schematic plan view showing the lever where no film is attached according to the second embodiment of the invention.
Figure 20A:
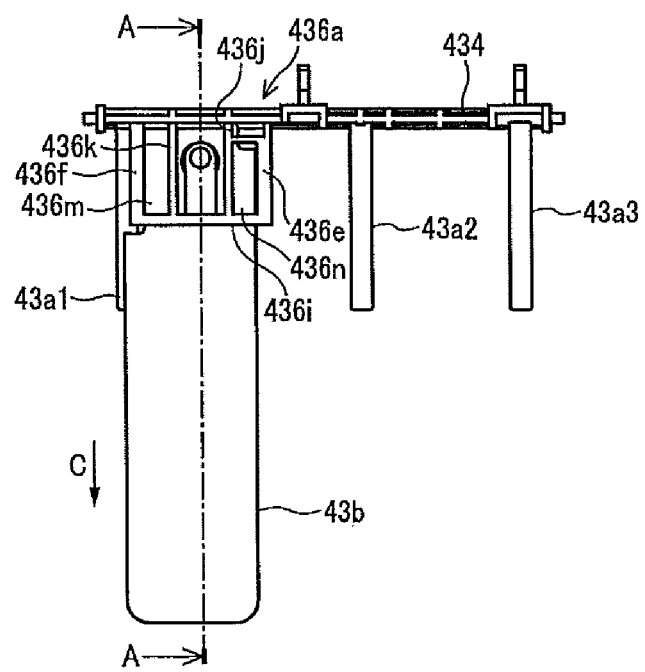
Figure 20B:
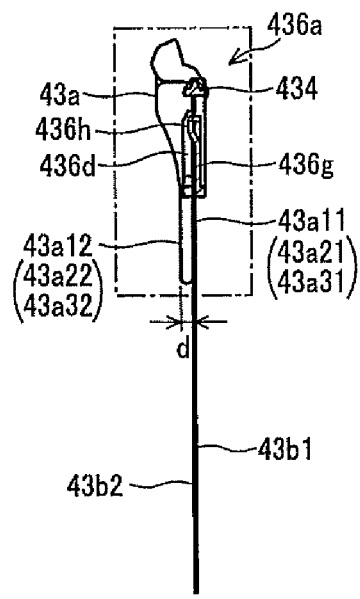
FIG. 20B is a cross-sectional side view cut along A-A line shown in FIG. 20A, showing the lever where the film is attached according to the second embodiment of the invention.

FIG. 16 is a schematic perspective view showing a lever where no film is attached according to the second embodiment, showing a situation that the film 43b is not attached to the lever 43a. FIG. 17 is a schematic perspective view showing a lever where a film is attached according to the second embodiment, showing a situation that the film 43b is attached to the lever 43a. FIG. 19 is a schematic plan view showing the lever where no film is attached according to the second embodiment. FIGS. 20A, 20B are a schematic plan view and a cross-sectional side view, respectively showing the lever where the film is attached according to the second embodiment. FIG. 20B is a cross section cut along A-A line shown in FIG. 20A.

As shown in FIG. 19, the lever 43a has a rotation shaft 434 extending in a direction perpendicular to the conveyance direction of the recording medium, lever portions 43a1, 43a2, 43a3 extending in a length L toward a direction away from the rotation shaft 434 (in a direction perpendicular to the rotation shaft 434), a shielding portion 436b shielding the sensor 43 shown in FIG. 9 for detecting the position of the rotation shaft 434, and a detachable portion 436a rendering the film 3b shown in FIG. 20 detachable serving as a detachable lever for changing the full-detection timing of the delivery stacker 42 shown in FIG. 9. Where the film 43b is attached to the detachable portion 436a of the lever 43a, the film 43b functions as a detection means together with the lever 43a.

As shown in FIGS. 20A, 20B, the lever portions 43a1, 43a2, 43a3 are formed to be substantially the same phase in the rotation direction of the lever 43a. The lever portions 43a1, 43a2, 43a3 are formed with first surfaces 43a12, 43a 22, 43a32 as surfaces contacting to the recording medium, and second surfaces 43a11, 43a21, 43a31 as surfaces non-contacting to the recording medium and as the opposite surfaces to the first surfaces 43a12, 43a 22, 43a32, respectively, in keeping a distance or thickness d therebetween. The film 43b is made of a sheet shaped film, and where the film 43b is attached to the detachable portion 436a, the second surfaces 43a11, 43a21, 43a31 are arranged in the same plane as the film 43b.

Referring to FIGS. 16, 17, 20, the detachable portion 436a of the film 43b is described. In FIGS. 16, 17, 20, the detachable portion 436a is provided between the lever portion 43a1 and the lever portion 43a2 arranged in maintaining a prescribed distance in the direction extending the rotation shaft 434. The detachable portion 436a includes a first arm 436e extending a distance L3 in a direction away from the rotation shaft 434, and a second arm 436f arranged in maintaining a prescribed interval from the first arm 436e in the direction extending along the rotation shaft 434.

The detachable portion 436a has a first edge portion 436i connecting a tip end of the first arm 436e, as opposing to the rotation shaft 434, with a tip end of the second arm 436f, as opposing to the rotation shaft 434. The first edge portion 436i is extending substantially parallel to the rotation shaft 434 and arranged in maintaining the prescribed distance L3 in the direction extending along the rotation shaft 434. The detachable portion 436a has a first restriction portion 436g disposed between the first arm 436e and the second arm 436f for restricting a non-contacting side 43b1 of the film 43b not contacting recording medium.

The detachable portion 436a has a second restriction portion 436d formed at the first arm 436e extending in a direction away from the rotation shaft 434 for restricting a contacting side 43b2 of the film 43b contacting recording medium. The detachable portion 436a further has a third restriction portion 436c formed at the second arm 436f extending in a direction away from the rotation shaft 434 for restricting a contacting side 43b2 of the film 43b contacting recording medium.

Figure 22:
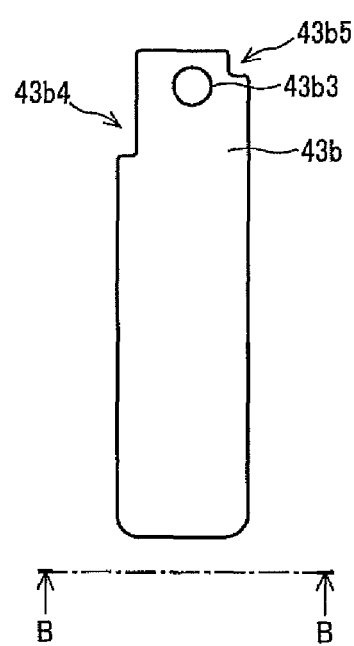
FIG. 22 is a plan view showing the film according to the second embodiment of the invention.

The first restriction portion 436g is formed in a cantilever shape extending from the first edge portion 436i toward the direction attaching the film 43b. A projection portion 436h serving as an engaging portion is formed on a side of a downstream end in the direction attaching the film 43b, as an opposing end side of the first edge portion 436i as a fixed end. The projection portion 436h is formed as extending from the first restriction portion 436g. The projection portion 436h is in a cylindrical shape and engages a hole 43b3 formed in the film 43b serving as an engaged portion as shown in FIG. 22 where the film 43b is attached. The projection portion 436h is formed with a slope portion 436h' formed facing the attaching direction at a position facing the attaching direction attaching the film 43b.

Ribs 436j, 436k extending toward the direction away from the rotation shaft 434 are formed at opposite ends, respectively. An opening 436n is formed between the rib 436j and the first arm 436e to confirm an insertion state of the film 43b, and an opening 436m is formed between the rib 436k and the second arm 436f.

The length L1 of the lever portions 43a1, 43a2, 43a3 in the conveyance direction of the recording medium is longer than the length L3 of the detachable portion 436a in the conveyance direction of the recording medium but is smaller than the length L2 of the film 43b in the conveyance direction of the recording medium. That is, the length L2 between the rotation shaft 434 and the downstream end of the film 43b in the medium conveyance direction is longer than the length L1 between the rotation shaft 434 and the downstream end of the lever portions 43a1, 43a2, 43a3 in the medium conveyance direction. A width W1 of the lever portion 43a1 in the direction of the rotation shaft 434 is formed shorter than a width W2 of the film 43b in the direction of the rotation shaft 434. That is, the width W2 of the film 43b in the direction perpendicular to the medium conveyance direction is formed longer than the width W1 of the lever portions 43a1, 43a2, 43a3 in the direction perpendicular to the medium conveyance direction.

Figure 10:
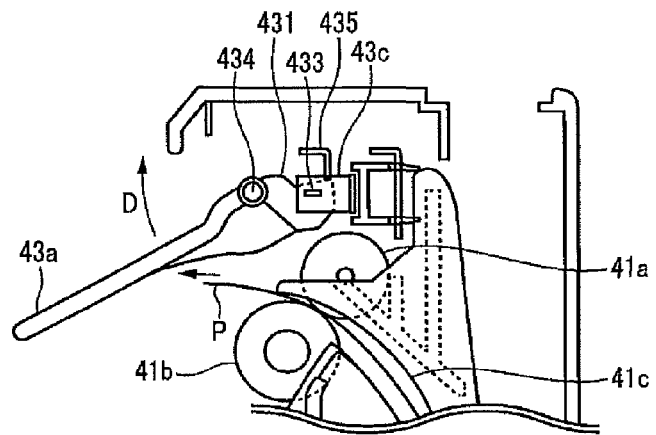
FIG. 10 is a schematic side view showing an essential portion of the delivery mechanism where no film is attached according to the second embodiment of the invention.
Figure 11:
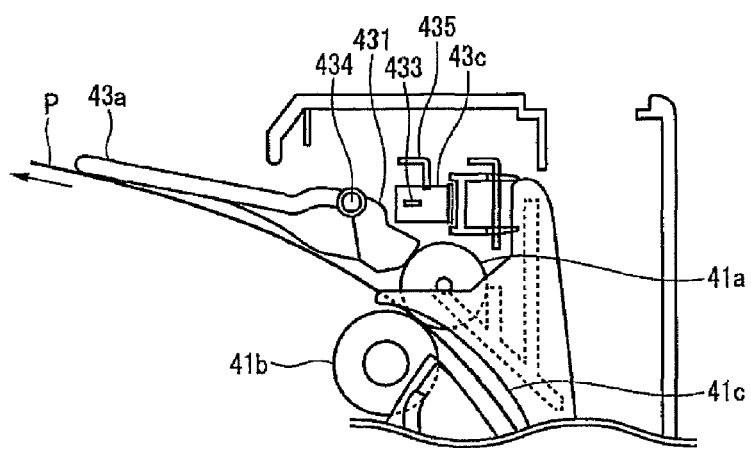
FIG. 11 is a schematic side view showing the essential portion of the delivery mechanism where no film is attached according to the second embodiment of the invention.

Referring to FIG. 9 through FIG. 13, operation of the delivery mechanism when no film is attached is described. It is to be noted that FIG. 10 through FIG. 13 are schematic side views showing the delivery mechanism shown in FIG. 9 in an enlarged manner. As shown in FIG. 10, a recording medium P applied with heat and pressure between the first fixing roller 38 of the fixing unit 37 and the second fixing roller 40 disposed facing the first fixing roller 38 is delivered from the delivery rollers 41a, 41b. At that time, a front end of the delivered recording medium P comes to contact the lever 43a having no film, and the lever 43a rotates in a clockwise direction shown in an arrow D in FIG. 10 around the rotation shaft 434 as a rotation center. FIG. 11 shows a movement that the recording medium P is delivered as pushing out the lever 43a.

After a rear end of the recording medium p passes by the delivery rollers 41a, 41b, the lever 43a rotates by its weight in a counterclockwise direction around the rotation shaft 434 as a rotation center, and stops at a position that a shielding rib 431 contacts the plate inner 435, where the shielding rib 431 is located on the opposite side with respect to the rotation shaft 434 as opposing to a position at which the recording medium P contacts. The lever 43a returns to a position shown in FIG. 10. Where the total delivered amount of the recording media increase, and where the recording media stacked on the delivery stacker 42 reach the tip of the lever 43a, the lever 43a rotates by its weight in the counterclockwise direction around the rotation shaft 434 as a rotation center, and stops, thereby rendering the stop position of the lever 43a at a position that the tip contacts the recording medium.

This is because the tip of the lever 43a, or namely an end opposite to the shielding rib 431 with respect to the rotation shaft 434, contacts the recording media stacked on the delivery stacker 42. The stop position of the lever 43a is a position a little rotated in the clockwise direction from the position that the shielding rib 431 contacts the inner plate 435. This stop position of the lever 43a proceeds in the clockwise direction as the stacking amount of the recording media stacked on the delivery stacker 42 increases, and when the shielding rib 431 of the lever 43a reaches a position shown in FIG. 12, the full state of the delivery stacker 42 is detected.

Figure 12:
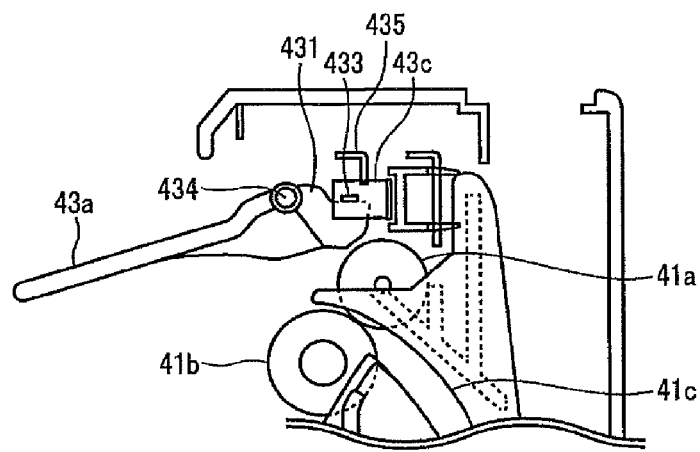
FIG. 12 is a schematic side view showing the essential portion of the delivery mechanism where no film is attached according to the second embodiment of the invention.
Figure 13:
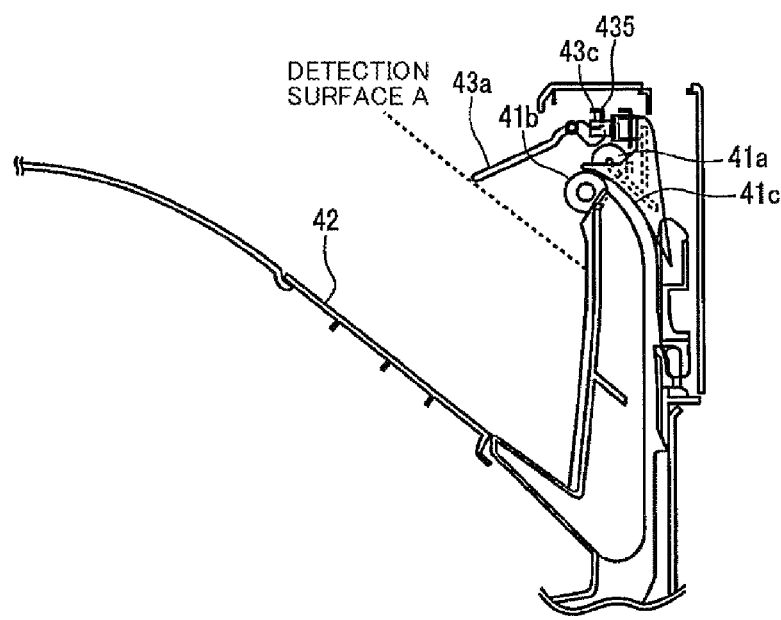
FIG. 13 is a schematic cross-sectional side view showing the delivery mechanism where no film is attached according to the second embodiment of the invention.

FIG. 12 shows a position of the lever 43a not shielding a detection unit 433 of the sensor 43c detecting the lever 43a with the shielding rib 431 of the lever 43a. If the recording media are stacked on the delivery stacker 42 up to when the lever 43a reaches the position shown in FIG. 12, the sensor 43c comes not to detect the shielding rib 431 of the lever 43 at any time, so that the full state of the delivery stacker 42 is detected. FIG. 13 shows the delivery mechanism when detecting the full state of the delivery stacker 42. The detection surface of the recording media stacked on the delivery stacker 42 detected as in the full state is positioned at a detection surface A shown with a broken line in FIG. 13.

Thus, switching between detection and non-detection of the full state of the delivery stacker 42 depends on a rotation angle of the lever 43a contacting the recording media stacked on the delivery stacker 42 after the recording media pass the delivery rollers 41a, 41b. Accordingly, where the stacking amount of the recording media detecting the full state of the delivery stacker 42 is to be changed, the position of the lever 43a contacting the recording media stacked on the delivery stacker 42 is changed to change the rotation angle of the lever 43a detecting the full state of the delivery stacker 42. For this purpose, the film 43b shown in FIG. 14 is attached to the lever 43a to obtain substantially the same advantage as extending the tip of the lever 43a contacting the recording media stacked on the delivery stacker 42.

Figure 15:
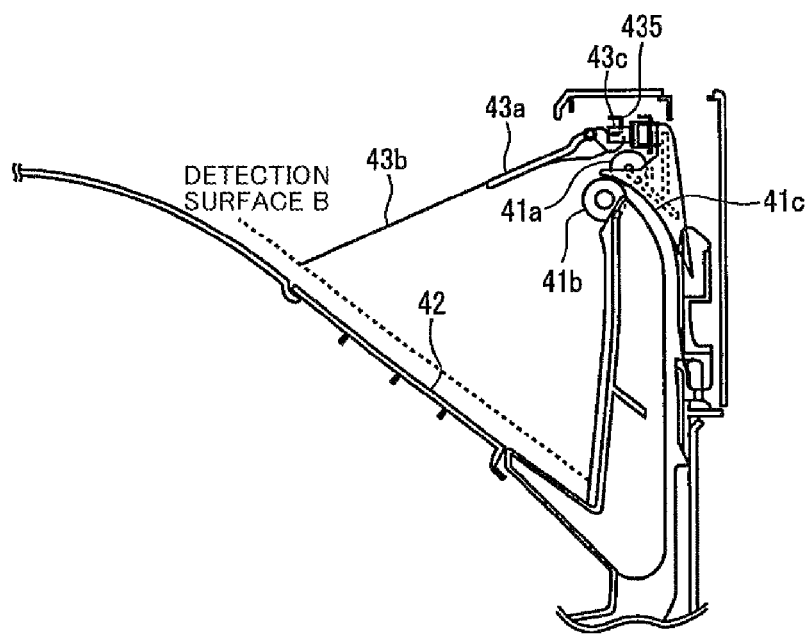
FIG. 15 is a schematic cross-sectional side view showing the delivery mechanism where the film is attached according to the second embodiment of the invention.

Referring to FIGS. 14, 15, the operation of the delivery mechanism when the film is attached is described. FIGS. 14, 15 are schematic cross-sectional side views showing the delivery mechanism; FIG. 14 shows the delivery mechanism in which the film 43b is attached to the lever 43a; FIG. 15 shows the delivery mechanism detecting the full state of the delivery stacker 42. As shown in FIG. 14, where the film 43b is attached to the lever 43a, the detection surface of the recording media stacked on the delivery stacker 42 detected as the full state is positioned at a detection surface B shown with a broken line as shown in FIG. 15. In comparison with the situation where the film 43b is not attached to the lever 43a as shown in FIG. 13, the full state of the delivery stacker 42 is detected in a smaller stacking amount of the recording media. It is to be noted that the rotation angle of the lever 43a shown in FIG. 13 coincides to the rotation angle of the lever 43a shown in FIG. 15.

Figure 18:
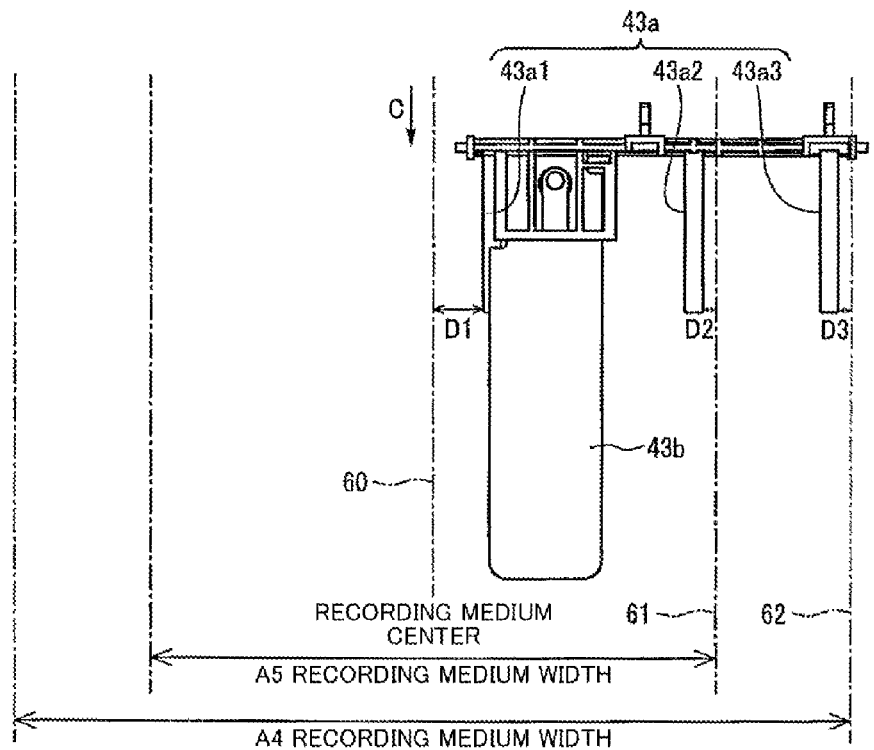
FIG. 18 is a schematic plan view showing a layout including the lever where the film is attached according to the second embodiment of the invention.

Next, referring to FIGS. 16 to 18, operation of the lever 43a is described. The lever 43a includes the three lever portions 43a1, 43a2, 43a3, and is arranged on one side in the width direction perpendicular to the conveyance direction of the recording medium shown as an arrow C with respect to a center line 60 of the recording medium, or a recording medium center 60, to be delivered as shown in FIG. 18. The film 43b is disposed on a side closer to the center line of the recording medium.

The lever portion 43a2, among the three lever portions 43a1, 43a2, 43a3, is disposed on a side of the recording medium center 60 with respect to an end 61 of the recording medium width of A5 size in keeping a predetermined distance D2 (for example, 6 mm), and the lever portion 43a3 is disposed on a side of the recording medium center 60 with respect to an end 62 of the recording medium width of A4 size in keeping a predetermined distance D3 (for example, 6 mm). The lever portion 43a1 is disposed on an outer side in the width direction perpendicular to the conveyance direction of the recording medium shown as an arrow C with respect to the recording medium center 60 in keeping a predetermined distance D1 (for example, 20 mm). The lever portion 43a1 disposed closest to the recording medium center 60, among the three lever portions 43a1, 43a2, 43a3, is therefore capable of detecting a recording medium having a minimum printable recording medium width of the printing apparatus.

Formation of the lever portions 43a2, 43a3 further prevents the recording media from subjecting to stacking failures occurring due to curling of the recording media stacked on the delivery stacker. FIG. 19 shows a state that curling occurs on the recording media stacked on the delivery stacker 42. The lever portion 43a2 at that time contacts the curled recording media, but the lever portion 43a3 does not contact the curled recording media. That is, if only the lever portion 43a3 is provided, the full state detection of the delivery stacker is possible when further more recording media are stacked, and at that time, the end in the width direction of the recording medium is bent more upward by curling, so that the stacked recording media are pushed by the recording medium under conveyance where the pushed end reaches the height of the delivery rollers, thereby causing stacking failures of the recording media.

To prevent such a stacking failure from occurring, the lever portions 43a2, 43a3 are provided at the positions in matching the widths of the recording media in sizes A4, A5, thereby detecting the full state of the delivery stacker before occurring the stacking failure of the recording media, and being capable of stopping the printing operation. The film 43b is disposed on a side of the recording medium center 60, so that the full state of the delivery stacker can be detected around the recording medium center even where the width of the recording medium is the maximum or minimum. It is to be noted that where the film 43b is disposed on a side remote from the recording medium center 60, the full state of the delivery stacker may not be detected where the recording medium has a small width.

Figure 21:
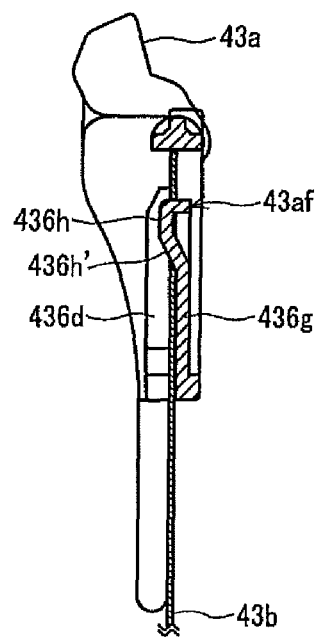
FIG. 21 is a schematic side view showing the lever where the film is attached according to the second embodiment of the invention.

Referring to FIGS. 20A, 20B, 21, 22, 23, the effect of the film 43b is described. FIG. 20A is a schematic plan view showing the lever where the film is attached according to the second embodiment. FIG. 20B is a cross-sectional side view cut along A-A line in FIG. 20A. FIG. 21 is a schematic view showing a chain line area in FIG. 20B in an enlarged manner. FIG. 22 is a plan view showing the film 43b. The arrow C shown in FIG. 20 indicates a conveyance (delivery) direction of the recording medium.

The film 43b is prevented from falling off from the lever 43a by engaging the hole 43b3 of the film 43b shown in FIG. 22 with the projection portion 436h of a nail portion 43a f of the lever 43a shown in FIG. 21, and the position of the film 43b is set with respect to the lever 43a from a peripheral shape of the film 43b. Detachment of the film 43b from the lever 43a is done by pulling the film 43b while the projection portion 436h of the nail portion 43a f is disengaged from the hole 43b3.

The shape of the film 43b, as shown in FIG. 22, is asymmetric shape sandwiching the hole 43b3 in forming a cutoff portion 43b4 on one side in a direction perpendicular to the attaching direction for the lever 43a, and a cutoff portion 43b5 smaller than the cutoff portion 43b4 on the other side, thereby preventing the film 43b from being attached in the opposite way. It is to be noted that guide members are provided at the detachable portion 436a in matching the shapes of the cutoff portions 43b4, 43b5, respectively. The film 43b may be formed in an asymmetric form by forming the hole 43b3 shifted from the film center in the direction perpendicular to the attaching direction for the lever 43a.

Figure 23A:
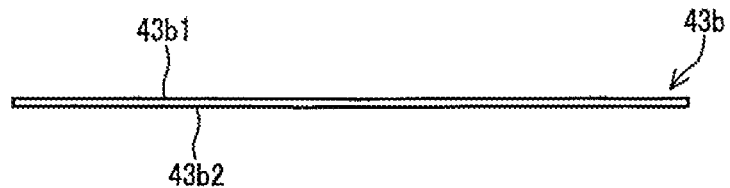
FIGS. 23A, 23B, 23C are side views, respectively showing the film according to the second embodiment of the invention.

Referring to FIG. 23, the reason is described. FIG. 23 is a view when seen along arrows B, B in FIG. 22; a lower surface in FIG. 23 is a contact surface 43b2 to which the delivered recording medium contacts; FIG. 23A shows a cross section of the film 43b.

Figure 23B:
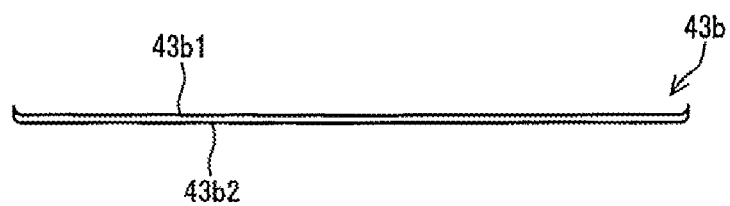

In general, the film 43b may be formed with so called burred side and drooped side as shown in FIG. 23B during manufacturing steps of the film 43b. In this embodiment, the contact surface 43b2 is set as the drooped side. This is because the recording medium may be jammed due to hooking of the recording medium to the end of the film 43b, or may be subject to conveyance failure, where the recording medium contacts the contact surface 43b2 when the recording medium is delivered, and to prevent such a conveyance failure from occurring, the contact surface 43b2 is set as the drooped side.

Figure 23C:

Moreover, the film 43b may be formed with a curved surface as shown in FIG. 23C during manufacturing steps of the film 43b. In this embodiment, the contact surface 43b2 is set as the convex surface. This is because, where a center portion of the contact surface 43b2 of the film 43b (or namely, a center portion in a direction perpendicular to the conveyance direction of the recording medium) is set as a convex shape, the conveyed and delivered recording medium easily contacts the center portion of the contact surface 43b2 of the film 43b. The reason why the delivered recording medium is made to easily contact the center portion of the contact surface 43b2 of the film 43b is that contacting the recording medium at center portion of the contact surface 43b2 of the film 43b can make smaller damages to the recording media than contacting the recording medium at an edge of the contact surface 43b2 of the film 43b.

Thus, the cutoff portion 43b4 is formed for making the contact surface 43b2 of the film 43b as a drooped side, making the center portion of the contact surface 43b2 the convex shape, and attaching the film 43b whose sides are correctly set to the lever 43a. Where the stacked amount of the recording medium for detecting the full state of the delivery stacker 42 is made in a smaller amount, if the tip of the lever 43a is extended, an advantage substantially the same as attachment of the film 43b is obtainable, but if the tip of the lever 43a is extended, the weight of the lever 43a becomes heavier. While the front end of the recording medium may require to push up the lever 43a when the recording medium is delivered, the load to push up the lever 43a by the recording medium may be increased according to the increased weight of the lever 43a.

In this situation, if the recording medium is a thin paper having a low rigidity, the recording medium cannot push up the lever 43a, and may be bent, so that the front end may fall off toward the delivery stacker with an obtuse angle. Consequently, stacking failures such as disorder in page, lost page, and curling may occur. According to this embodiment, detachably attaching the film 43b to the lever 43a allows the sheet number of the paper or recording media stacked on the delivery stacker when the full state of the delivery stacker is detected to be changed. By extending the lever 43a through attaching the light weight film 43b to the lever 43a, the load to the recording medium can be suppressed from increasing, thereby preventing stacking failures from occurring.

As described above, according to the second embodiment, the film 43b is detachably attached to the lever 43a, so that the stacking amount of the recording media for detecting the full state of the delivery stacker can advantageously be changed. By extending the lever 43a through attaching the light weight film 43b to the lever 43a, the load to the recording medium can be suppressed from increasing, thereby advantageously preventing stacking failures from occurring. Because the stacking amount of the recording media for detecting the full state of the delivery stacker is determined by the length of the film 43b, the stacking amount of the recording media for detecting the full state of the delivery stacker can advantageously be freely and easily changed by changing the shape of the film 43b.

It is to be noted that in the first and second embodiments, the image forming apparatus is described as the printing apparatus, but the invention is not limited to those apparatuses, and is applicable to photocopiers or MFPs (Multifunction Peripherals/Printers/Products) having a detection sensor detecting a full state of a delivery stacker. The image forming apparatus is described with the image forming apparatus of a direct transfer type, but the invention is not limited to this, and is applicable to an image forming apparatus having an intermediate transfer belt.

The present invention is not limited to the foregoing embodiments but many modifications and variations are possible within the spirit and scope of the appended claims of the invention.

What is claimed is:

1. A medium delivery apparatus comprising:
   a delivery unit for delivering a conveyed medium;
   a medium stacking unit for stacking the medium delivered from the delivery unit;
   a detection unit disposed between the delivery unit and the medium stacking unit in a medium conveyance direction for detecting an amount of the medium delivered to the medium stacking unit; and
   a sensor for sensing a motion of the detection unit,
   wherein the detection unit has a detachable tip portion.

2. The medium delivery apparatus according to claim 1, further comprising a detaching portion for detachably attaching the tip portion,
   wherein the detaching portion has a first restriction unit for restricting a non-contacting side of the tip portion not contacting to the medium, and a second restriction unit for restricting a contacting side of the tip portion contacting to the medium.

3. The medium delivery apparatus according to claim 2, wherein the first restriction unit is formed in a cantilever shape extending toward an attaching direction of the tip portion and includes an engaging portion that engages the tip portion on a downstream side in the attaching direction.

4. The medium delivery apparatus according to claim 3, wherein the engaging portion has an inclined portion formed as to direct the attaching direction.

5. The medium delivery apparatus according to claim 1, wherein the detection unit comprises:
   a rotation shaft; and
   a lever extending from the rotation shaft in a direction perpendicular to the rotation shaft,
   wherein a distance between the rotation shaft and a downstream end of the tip portion in the medium conveyance direction is longer than a distance between the rotation shaft and a downstream end of the lever in the medium conveyance direction.

6. The medium delivery apparatus according to claim 5, wherein the tip portion has a width in a direction perpendicular to the medium conveyance direction, which is wider than a width of the lever in a direction perpendicular to the medium conveyance direction.

7. The medium delivery apparatus according to claim 1, where the sensor senses the motion of the detection unit where an interval between the media conveyed to the delivery unit is equal to or less than a threshold value.

8. The medium delivery apparatus according to claim 1, further comprising a display unit indicating a full status of the media stacked on the medium stacking unit when a detection time at the sensor exceeds a threshold value.

9. An image forming apparatus comprising the medium delivery apparatus according to claim 1.

10. The medium delivery apparatus according to claim 1, further comprising a plurality of lever portions disposed in keeping a predetermined distance from the tip portion in a direction perpendicular to the medium conveyance direction,
    wherein the length of the tip portion in the medium conveyance direction is longer than the length of the plurality of lever portions in the medium conveyance direction.

11. The medium delivery apparatus according to claim 1, wherein the tip portion includes a film, and wherein a center portion of the film in a direction perpendicular to the medium conveyance direction is set as a convex shape that is protruded from the both end portions.

12. The medium delivery apparatus according to claim 11, wherein the tip portion includes a film, both sides of the film contacting to the medium conveyed are drooped sides.

* * * * *